3,106,233
BROKEN SCREW EXTRACTOR AND DRIVER
Joseph Wolny, 1005 Arapahoe Ave., Boulder, Colo.
Filed Aug. 14, 1961, Ser. No. 131,153
6 Claims. (Cl. 145—1)

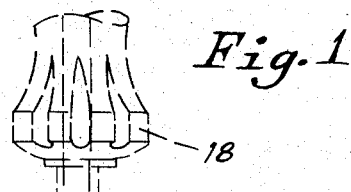
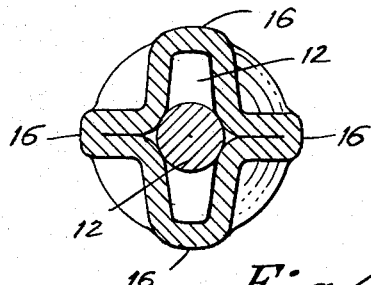
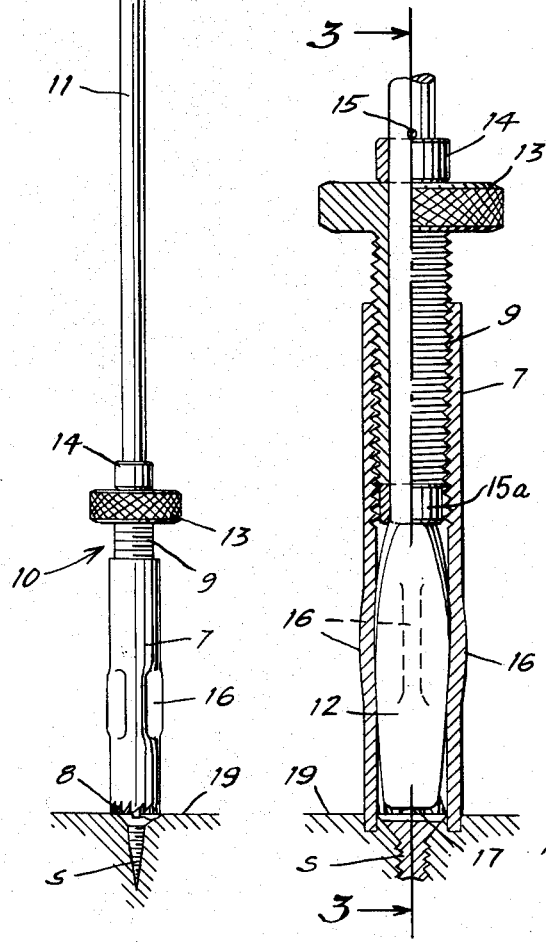
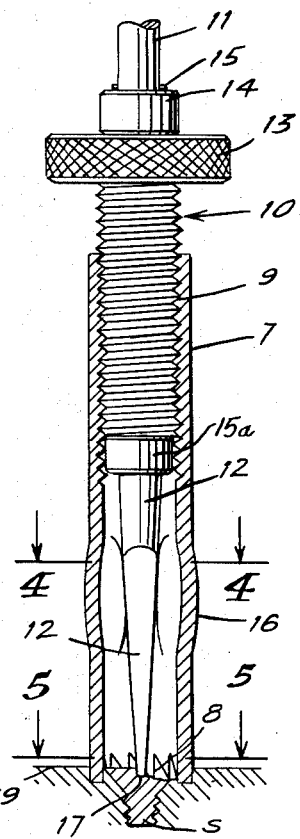
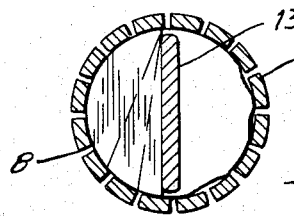
INVENTOR
Joseph Wolny

United States Patent Office 3,106,233
Patented Oct. 8, 1963

This invention relates to new and useful improvements in broken screw extractors and more particularly to that type of extractor that can not only extract broken screws from wood, but can also be used as a screw driver by merely making an adjustment to one of its major parts.

It is therefore one of the objects of this invention to provide a broken screw extractor and driver all in one simple hand tool that can readily be used by anyone having little or no experience in the wood-working arts.

Another object of this invention is to provide a broken screw extractor and driver that can easily and quickly remove a broken screw from wood without splintering the wood, or doing any damage thereto in the thread region of said broken screw.

Another object of this invention is to provide a broken screw extractor and driver that will remove any broken head wood screw so clean from the wood that another screw may be inserted back into the exact same hole.

Another object of this invention is to provide a broken screw extractor and driver than can be manufactured in a variety of sizes and with any kind of handle that may be desired.

Other and further objects and advantages of this broken screw extractor and driver will be hereinafter described, and the novel features thereof defined in the appended claims.

Referring to the drawing:

FIG. 1 is a side view of this invention placed on the broken head of a wood screw that is ready for extraction.

FIG. 2 is a vertical sectional view of this invention placed on the broken head of a screw that is ready for extraction.

FIG. 3 is a sectional view taken substantially along line 3—3 of FIGURE 2 as viewed in the direction indicated by the arrows.

FIG. 4 is a sectional view taken substantially along lines 4—4 of FIGURE 3 as viewed in the direction indicated by the arrows.

FIG. 5 is a sectional view taken substantially along lines 5—5 of FIGURE 3 as viewed in the direction indicated by the arrows.

Similar reference characters refer to similar parts throughout the several views of the drawing.

Having reference now to the drawing in detail, and in particular to FIGURES 2 and 3, there is generally indicated by the reference character 7 a tubular member having saw teeth 8 around the periphery of its lower or free end while its upper portion contains a plurality of internal threads to which is adapted to receive the external threads 9 of a rotatable adjusting member 10 through the vertical center of which passes the shaft 11 of the blade 12. The upper portion of the aforesaid adjusting member 10 carries an enlarged knurled turning ring 13 above which is a separate collar 14 that is prevented from sliding upward on the shaft by means of protrusion 15 on the said shaft. A further collar 15a is press fit onto shaft 11 below the lowermost end of adjusting member 10 for preventing member 10 from sliding downwardly on shaft 11. As a result, the externally threaded adjusting member 10 is freely rotatable on shaft 11, but is restrained against axial movement on said shaft by the elements 15 and 15a.

Returning for the moment to the foresaid tubular member 7, it will be seen on examination of the appended drawing that this member has a plurality of linear bulges 16 formed in the body thereof and around its periphery in radial-spaced relation to each other. These bulges are located approximately half way up the side of the said tubular member 7, and comprise abutments engaging spaced opposing portions of blade 12 thereby to permit relative axial motion between tubular member 7 and shaft 11, while simultaneously inhibiting relative rotational movement between said member 7 and shaft 11.

The previously mentioned blade 12 of this novel tool has the basic configuration of a typical screw driver in order that its flattened end 17 may be adapted to fit into the slot of a wood screw such as the one illustrated at S in the appended drawing.

The uppermost end of the foresaid shaft 11 of this invention terminates in a handle 18 which is partly shown in dash lines in FIGURE 1 of the appended drawing.

From the foregoing it can now be seen that this unique invention actually consists of only three separate parts all adapted to cooperate with one another to form a most useful tool for extracting broken wood screws and at the same time being capable of use as a most practical screw driver as will be described in the use of this invention. The three foresaid parts to this device are, of course, the tubular member 7, the rotatable adjusting member 10, and the shaft 11 of blade 12, the last two-mentioned parts being made all from the same piece of steel or the like.

The actual method of use of this invention is almost self-understood when one examines the appended drawing. When one desires to extract a broken screw S from a piece of wood 19, the tubular member 7 is first placed over the said screw, and in surrounding relation to the screw head, with the saw teeth 8 resting on the wood 19. It is obvious, of course, that before tubular member 7 is placed as stated over the screw, the adjusting member 10 is rotated by the knurled turning ring 13, so as to move tubular member 7 in an axial downward direction relative to shaft 11 and handle 18. This action tends to recess end 17 of blade 12 into tubular member 7; and is continued until the blade 12 is visually seen to be approximately one-eighth to three-sixteenths of an inch above the head of the screw S when the tool is placed over the same. With teeth 8 engaging wood 19 around screw S, the shaft 11 is then rotated in a clockwise direction by appropriate manipulation of handle 18. Since the blade 12 is disposed between opposing internal portions of bulges 16, the tubular member 7, although movable in axial directions relative to shaft 11 by manipulation of ring 13, is effectively locked against significant rotational movement relative to shaft 11. Accordingly clockwise rotation of shaft 11 will effect a like clockwise rotation of tubular member 7, thereby causing saw teeth 8 to cut into the wood 19 around the head of screw S. The relative positioning of the parts will then assume the configuration shown in FIGURES 2 and 3, thereby permitting the lowermost end 17 of blade 12 to engage the slot of screw S. The handle 18 is then turned in an opposite or counterclockwise direction; and this subsequent manual rotation of handle 18 of the shaft 11 and blade 12 will naturally result in the backing out of the broken screw from the wood 19 when it, the handle, is turned in said counterclockwise direction.

When it is desired to use the device as a screw driver rather than as an extractor, it is only necessary to rotate the foresaid adjusting member 10 by its knurled ring 13 in the reverse direction than when using the tool as a broken screw extractor. This will result in the tubular member 7 being drawn axially upward on shaft 11, thereby causing the flattened end 17 of blade 12 to protrude below the level of teeth 8 of the tubular member 7; and the structure can then be used as a screw driver in conventional manner without the teeth 8 engaging wood 19.

From the foregoing it will now be seen that there is herein provided a broken screw extractor and driver which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

I claim:

1. A combination screw extractor and driver comprising an elongated shaft having unitary blade means at one end thereof, a hollow cylindrical adjusting member disposed in surrounding relation to said shaft, means for restraining said adjusting member against axial movement along said shaft while permitting rotational movement of said adjusting member on said shaft, said adjusting member having a threaded surface, a threaded tubular member disposed in surrounding relation to said shaft adjacent to said blade means and in thread engagement with said adjusting member, means for restraining rotational movement of said tubular member relative to said shaft while permitting axial movement of said tubular member along said shaft, cutting means carried by said tubular member, whereby rotation of said adjusting member effects axial variations in the position of said tubular member and of said cutting means relative to said blade means, and means for rotating said shaft thereby to rotate said tubular member into cutting engagement with a body of material containing a screw member to be extracted by said blade means.

2. A broken screw extractor comprising a shaft having blade means at one end thereof adapted to engage the head of a screw to be extracted, a tubular member disposed in surrounding relation to said shaft adjacent said blade means, means for restraining rotational movement of said tubular member relative to said shaft while simultaneously permitting the axial positions of said shaft and said tubular member to be varied relative to one another, said tubular member being provided with serrations for cutting into a body of material containing a screw to be extracted, and means for selectively varying the axial positioning of said tubular member along the direction of elongation of said shaft thereby to vary the position of said serrations relative to said blade means.

3. A broken screw extractor and driver comprising an elongated shaft having a blade at one end thereof adapted to engage the head of a screw for extracting or driving operations, an elongated tubular member disposed in surrounding relation to said shaft adjacent said blade, means disposed between said blade and tubular member for restraining rotational movement of said tubular member relative to said shaft whereby rotation of said shaft effects like rotation of said tubular member, said tubular member being provided with serrations at its lowermost end adjacent said blade, and means for variably positioning said tubular member along the direction of elongation of said shaft whereby said blade may be recessed into said tubular member above the position of said serrations when it is desired to effect a screw extracting operation, and whereby said blade may be caused to protrude outwardly of said tubular member below the position of said serrations when it is desired to effect a screw driving operation.

4. The structure of claim 3 wherein said means for restraining said relative rotational motion comprises abutment means disposed on the inner surface of said tubular member adjacent spaced opposing portions of said blade.

5. The structure of claim 3 wherein said tubular member defines a plurality of internal threads, said means for variably positioning said tubular member along said shaft comprising an externally threaded adjusting member surrounding said shaft and rotatable relative to said shaft, the external threads of said adjusting member being in thread engagement with said internal threads of said tubular member.

6. In combination, a screw driver comprising an elongated shaft having a blade at one end thereof and a handle at its other end, said handle, blade, and shaft comprising a unitary assembly whereby rotation of said handle effects like rotation of said shaft and blade, a hollow cylindrical adjusting member rotatably disposed in surrounding relation to said shaft at a position between said blade and handle, said adjusting member having a plurality of external screw threads, an internally threaded hollow tubular member disposed in surrounding relation to said shaft between said adjusting member and said blade, the internal threads of said tubular member being in engagement with the external threads of said adjusting member adjacent one end of said tubular member, the other end of said tubular member comprising a free end positioned adjacent said blade, means positioned between said tubular member and said shaft adjacent said blade for restraining rotational movement of said tubular member relative to said shaft while permitting axial movement of said tubular member relative to said shaft, whereby rotation of said adjusting member effects variations in the position of the free end of said tubular member relative to said blade, and cutting means formed in the free end of said tubular member whereby said tubular member may be placed in contact with a body of material and caused to cut into said body of material by rotation of said handle until said blade is in firm engagement with a screw member to be extracted from said body of material.

References Cited in the file of this patent

UNITED STATES PATENTS

| 1,548,835 | French | Aug. 11, 1925 |
| 1,785,847 | Valentine | Dec. 23, 1930 |
| 2,522,996 | Cone | Sept. 19, 1950 |

FOREIGN PATENTS

| 37,722 | Netherlands | Mar. 16, 1936 |